United States Patent [19]

Shelley

[11] Patent Number: 4,847,892

[45] Date of Patent: Jul. 11, 1989

[54] DIAL-IN DATA TRANSMISSION SYSTEM WITH STANDBY CAPABILITY

[76] Inventor: Edwin F. Shelley, 339 Oxford Rd., New Rochelle, N.Y. 10804

[21] Appl. No.: 171,481

[22] Filed: Mar. 21, 1988

[51] Int. Cl.[4] .......................................... H04M 11/00
[52] U.S. Cl. ...................................... 379/92; 379/93; 379/107
[58] Field of Search ................... 379/49, 92, 93, 106, 379/107

[56] References Cited

U.S. PATENT DOCUMENTS

| | | | |
|---|---|---|---|
| 4,104,486 | 8/1978 | Martin et al. | 379/107 X |
| 4,126,762 | 11/1978 | Martin et al. | 379/106 |
| 4,345,113 | 8/1982 | Shelley | 379/92 |
| 4,394,540 | 7/1983 | Willis et al. | 379/107 X |
| 4,469,917 | 9/1984 | Shelley | 379/93 |
| 4,504,831 | 3/1985 | Jahr et al. | 379/107 X |
| 4,549,044 | 10/1985 | Durham | 379/106 X |
| 4,578,534 | 3/1986 | Shelley | 379/93 X |
| 4,654,868 | 3/1987 | Shelley | 379/107 X |
| 4,682,169 | 7/1987 | Swanson | 379/107 X |

FOREIGN PATENT DOCUMENTS

WO87/07993 12/1987 PCT Int'l Appl. ................ 379/107

Primary Examiner—Keith E. George
Attorney, Agent, or Firm—Kenyon & Kenyon

[57] ABSTRACT

A data transmission system causes a remote data set to dial a central computer periodically and also causes the data set to stand by at more frequent intervals to detect a call from, and then return a call to, the computer via a non-dedicated telephone line. The system is coupled to a telephone instrument, a data set, and the telephone transmission line and normally connects the telephone instrument and the data set to the telephone transmission line. A clock in the system triggers the data set to call the central computer periodically, as for example once a month. More frequently, as for example during one hour each night, the clock connects the telephone instrument and the data set to a subsystem which stands by during the interval to detect a possible call from the computer. During the interval, the telephone instrument is normally disconnected from the telephone transmission line and the data set remains connected by the subsystem. A counting circuit senses the number of ring bursts in a ringing signal from a caller and the central computer, if it needs to access the data set, is programmed to ring once and "hang up". When only one ring burst is sensed, the data set dials up the central computer. If more than one ring burst occurs, a non-computer call is being sensed and the data set is disconnected and the telephone connected to the telephone transmission line so that normal telephone usage is allowed.

26 Claims, 6 Drawing Sheets

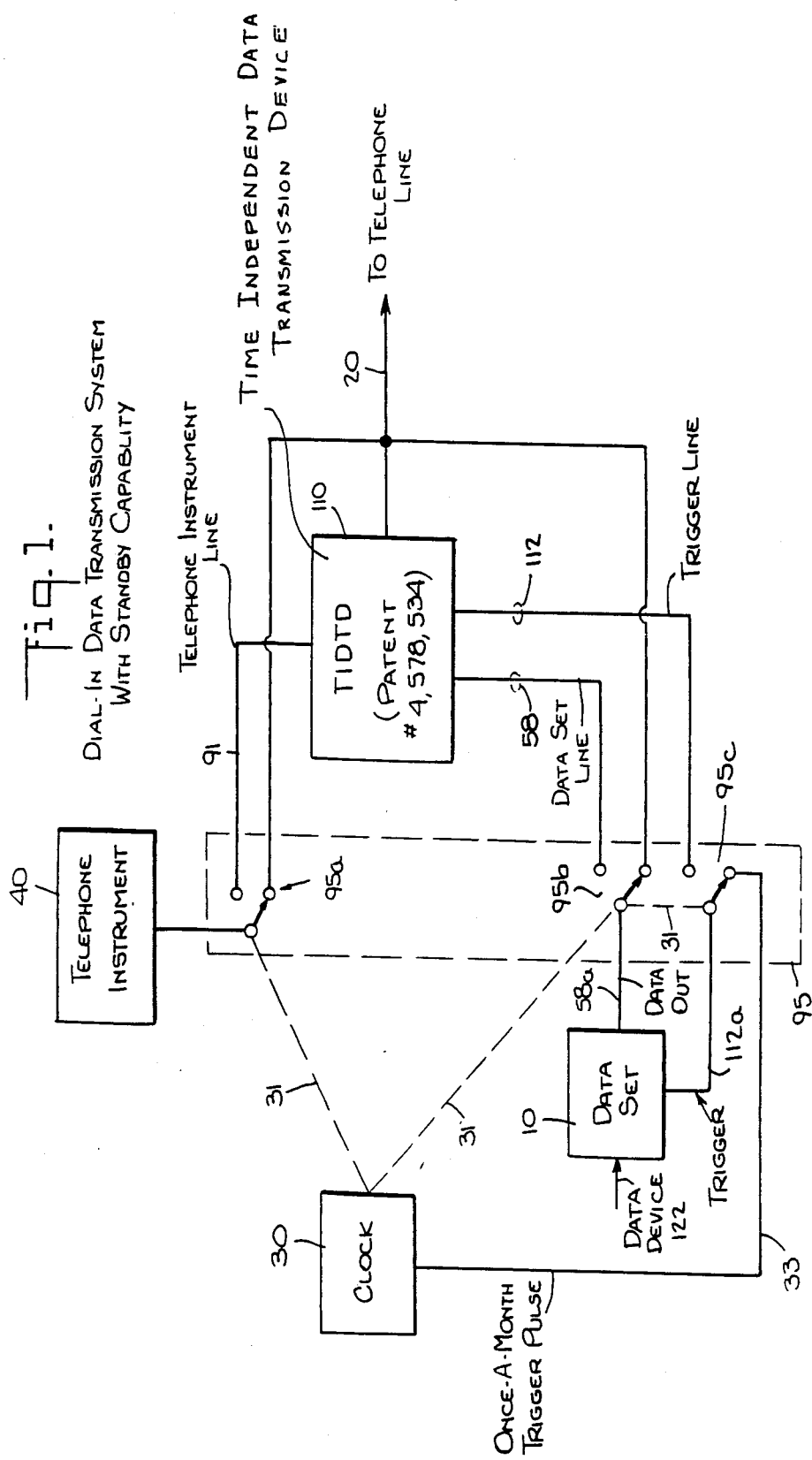

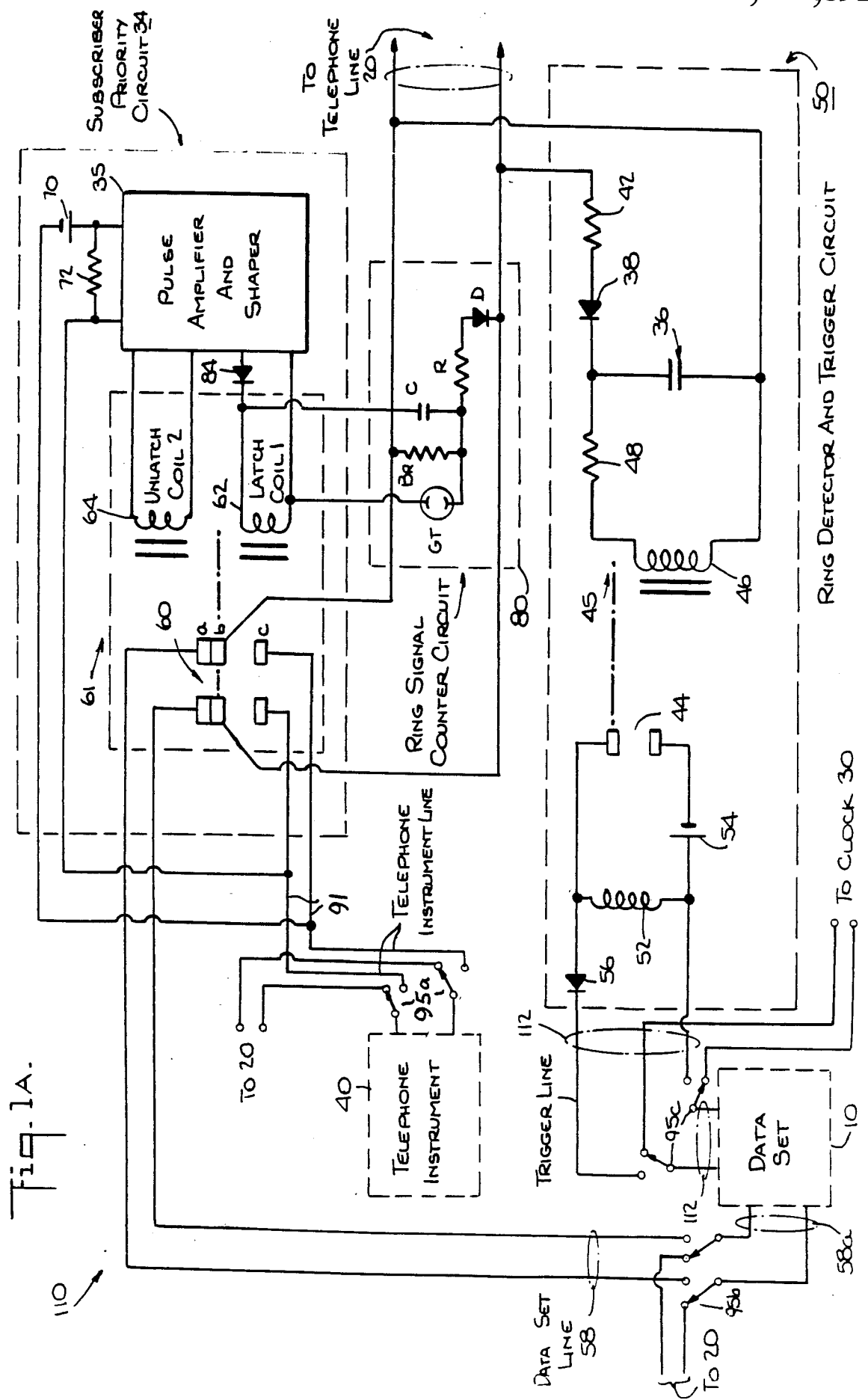

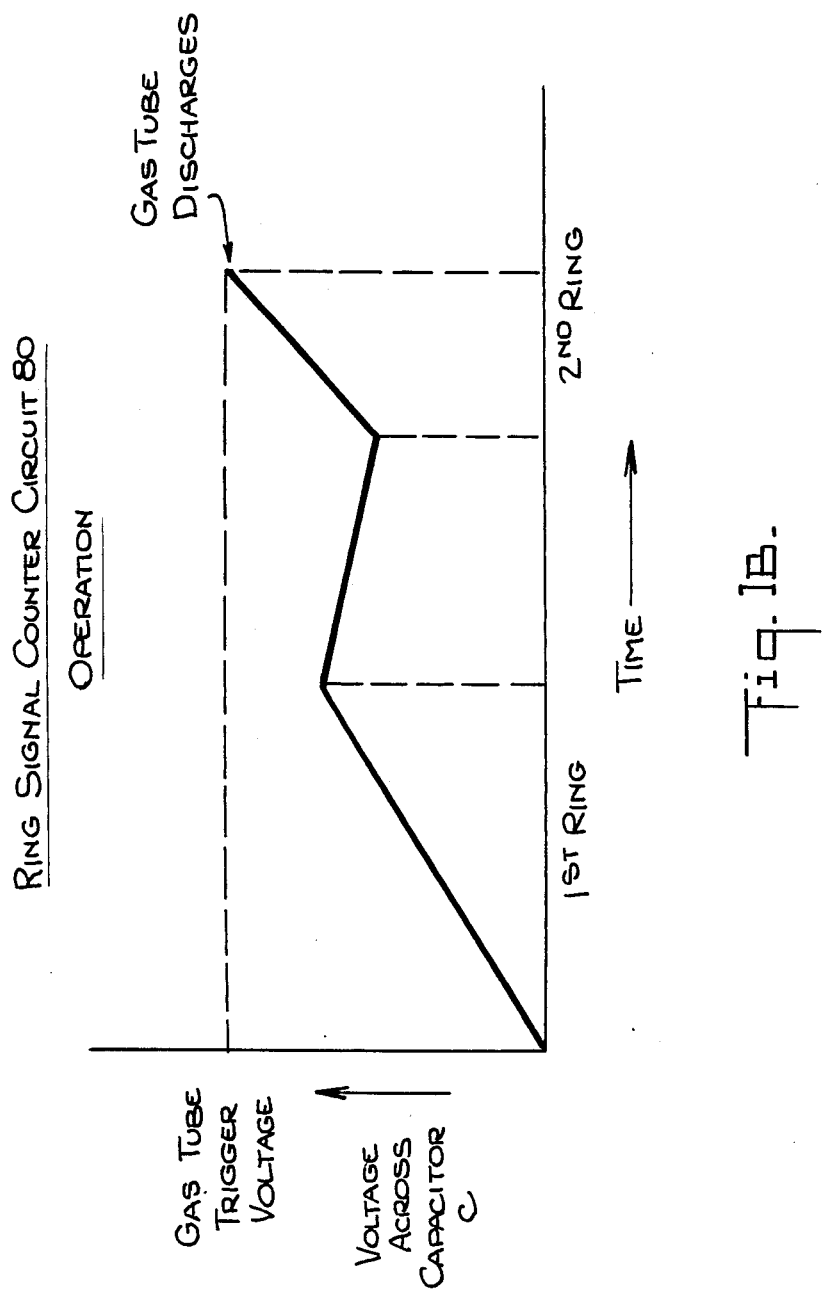

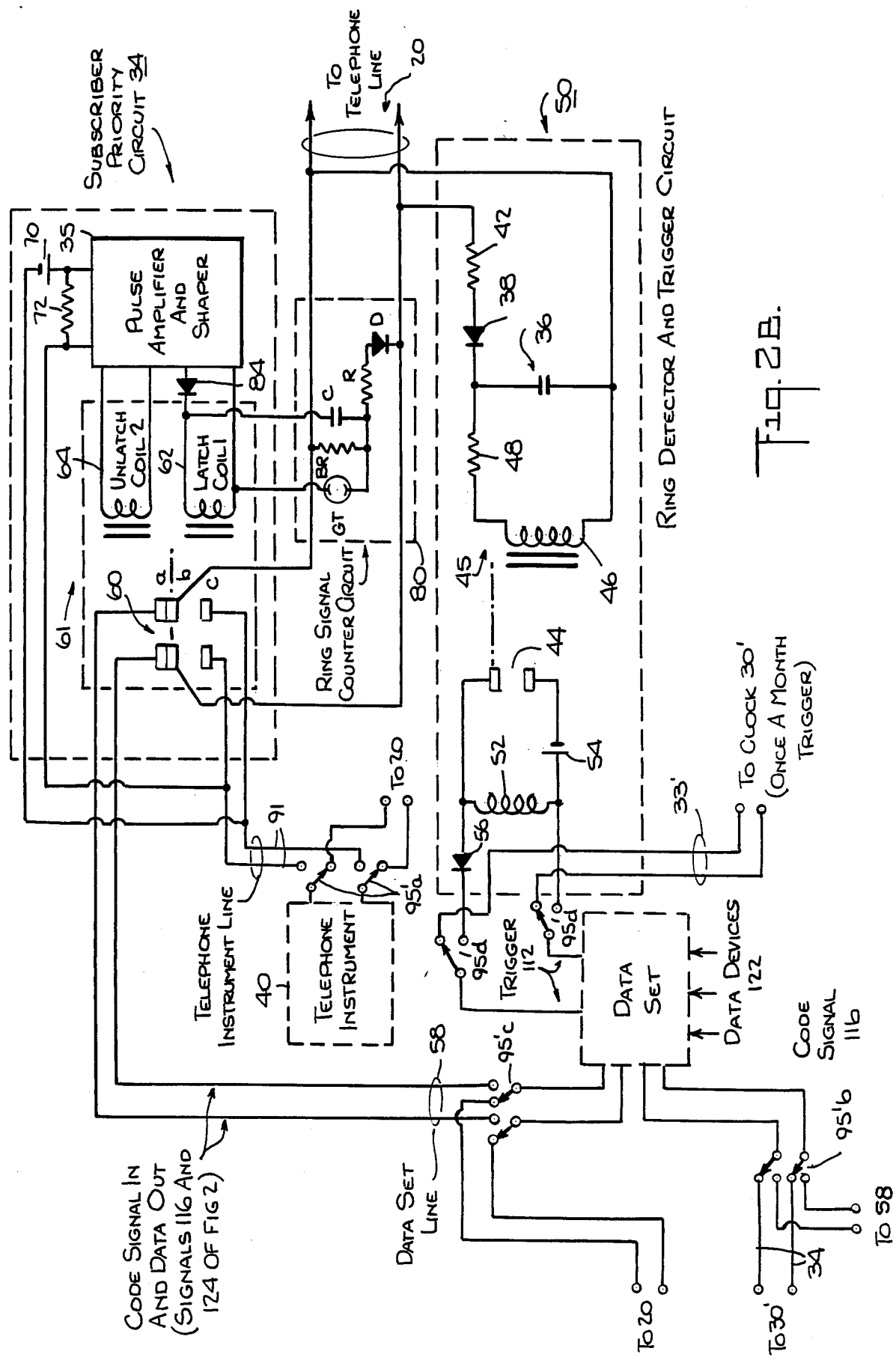

DIAL-IN DATA TRANSMISSION SYSTEM WITH STANDBY CAPABILITY

BACKGROUND OF THE INVENTION

The present invention relates generally to telephone data transmission systems, and more particularly to a dial-in data transmission system which allows a central computer, for example, to access a remote data set, such as an electronic publication storage device, a television polling system, a computer data base subscriber data set, or a utility meter or plurality of utility meters located in a business or residence, via non-dedicated telephone lines and communicate with that remote data set without substantially interfering with normal use of the subscriber's telephone. Even more particularly, the present invention relates to dial-in data transmission systems wherein the data device to be accessed dials up a central computer via telephone lines to communicate with the computer at a selected time and stands by to detect calls from the central computer at other selected times.

The present invention finds application in many areas, one of which, for instance, might be a shop by computer system where it might be necessary to transmit information to and from an individual subscriber's data set connected to an information storage device. Another might be the field of utility usage data retrieval, wherein a central computer accesses a remote data set which has stored therein data corresponding to the electrical or gas or other utility usage at the remote location. Thus, the present invention is useful for allowing a utility to read a utility meter located at a remote location, for example an electric meter or a gas or water usage meter. Still another application might be remote control of heating, ventilating and air-conditioning equipment through telephone lines, as for instance, in a utility's load management program. Although the invention will be described for use with telephone lines, it will be apparent to one skilled in the art that the invention can also be used with transmission media other than telephone lines.

Various systems are presently known which allow central computers to access individual subscriber's data sets via non-dedicated telephone lines. For example, see U.S. Pat. Nos. 4,126,762, 4,104,486, 4,394,540 and 4,345,113. In the 4,104,486 and 4,394,540 patents, the telephone is isolated from the telephone line during a selected time window. In U.S. Pat. No. 4,126,762, in one embodiment, a time window is utilized. In another embodiment, sequential ringing signals, having a different time spacing than signals from a normal telephone call condition a remote terminal to intercept the ringing signals and to provide selective connection of a data accumulator to the telephone line. It is preferable to use the subscriber's existing telephone line rather than install a separate dedicated line to provide access to the data set. Thus, systems of this type require that the telephone line be available for use both by ordinary persons and by computers calling the subscriber. Requirements of systems of this type are that when computer calls are received, the call is automatically transferred to a data set and the telephone preferably should not ring.

In applicant's prior U.S. Pat. No. 4,345,113, an automatic telephone message interception system is described which permits the use of a single telephone line for both ordinary personal use and for receiving calls from a computer, wherein computer calls are automatically transferred to the subscriber's data set without ringing the subscriber's telephone. An ordinary (non-computer) call made to the subscriber, would, however, be answered by the automatic telephone message interception system described in this U.S. patent even if no one were present at the subscriber's telephone. The caller would thus be charged for a brief call even though no actual person answered the phone.

The subscriber could, of course, solve this problem by shutting off the automatic system if the telephone is to be left unattended, but the data set could not be accessed by the computer while the system was shut off.

The need thus existed for a system which both allows a central computer to access the subscriber's data set via a non-dedicated telephone line and which allows normal operation of the telephone by both the subscriber and other persons calling the subscriber. In particular, such a system should allow a computer to access the subscriber's data set without ringing the subscriber's telephone and should allow persons to call the subscriber at any time without being charged for the call if the telephone is unanswered by a person.

Applicant's prior U.S. Pat. No. 4,469,917, issued Sept. 4, 1984, describes an apparatus which satisfies the above need.

In U.S. Pat. No. 4,469,917, a system and apparatus is described for connecting a central computer to a remote subscriber's data set using the subscriber's non-dedicated telephone line during a preselected window in time. 27 Furthermore, in applicant's prior U.S. Pat. No. 4,578,534, the apparatus described in U.S. Pat. No. 4,469,917 was modified to permit connection of the central computer at any time to a remote subscriber's data set using the subscriber's non-dedicated telephone line and without interference of any sort with normal use of the subscriber's telephone other than suppression of the first ring of an incoming call.

In the system of U.S. Pat. No. 4,469,917, the apparatus therein described detects a ringing signal on the telephone line during a preselected window in time during which the subscriber's data set is connected to the telephone line and the subscriber's telephone instrument is disconnected. The apparatus does nothing until the ringing signal stops, indicating that the caller has hung up. The apparatus then causes the data set to dial up the central computer and proceed to transmit or receive data during the time window.

In the device described in applicant's prior U.S. Pat. No. 4,578,534, the telephone instrument is normally disconnected from the telephone line. The central computer issues a ringing signal preferably having a single ring burst, and a device described in that patent detects the single ring burst and triggers a data set to dial-up the central computer and provide data over the telephone line to the central computer. If a ringing signal with more than one ring burst is detected, then the device recognizes that the call is not from the central computer and disconnects the data set from the telephone line and connects the telephone instrument to the telephone line, enabling the telephone to ring and the user to answer the call. Because the telephone is normally disconnected, if a ringing signal with only one ring burst is detected, the telephone subscriber never hears the call from the central computer.

In a further development, applicant's prior U.S. Pat. No. 4,654,868, the apparatus described in U.S. Pat. No.

4,578,534 was modified in order to allow its use in applications where more than one data set or data device is located at the remote location. For example, in U.S. Pat. No. 4,654,868, an apparatus is described where a plurality of consumption level devices, for example, electricity, gas and water meters, are interrogated at the remote location by a central computer Accordingly, the above patents describe various apparatus for allowing the central computer to access a remote data set via, for example, telephone lines. In applicant's estimation, the simplest system for allowing a central computer to access a remote data set, for example, to read a utility meter, is the so-called "dial-in" system wherein the meter interface device (data set) is connected directly across the telephone line, and a clock in the interface device causes the interface to dial the central computer's telephone number at a particular time each month and transmit the meter reading to the computer. Applicant's prior U.S. Pat. No. 4,469,917 describes a modified example of this type of device, improved to prevent interference with the subscriber's use of the telephone device at any time, even when the computer is communicating with the data set, and which allows a computer first to call the data set during a time window with the data set not answering but subsequently calling the computer back (in contrast to the simple dial-in system wherein the data set merely calls the central computer at the preselected time), and wherein a clock is utilized to disconnect the telephone instrument from the transmission line during predetermined time intervals allowing the computer to call the data set with the data set not answering but subsequently calling the central computer to provide communication during that time interval.

The major disadvantage of time-synchronized dial-in systems is the inability of the computer to establish contact with the data set at any time other than that programmed by the clock. Thus, for example, if a house or business is sold and the seller's utility account must be closed out, a meter reader must be dispatched to take a final reading on the day of the sale if that day does not coincide with the programmed time. This can be a time-consuming and expensive task, especially considering that in many areas of the country, 20% of the houses change hands each year. Accordingly, it would be advantageous if a system could be provided which would allow a central computer access to a remote data set not only at the preselected time (for example, once a month), but also during a preselected interval in time as required by the needs of the central computer, for example, a utility required to read a utility meter on a particular day.

SUMMARY OF THE INVENTION

Accordingly, it is an object of the present invention to provide a dial-in data transmission system wherein a central computer can access a remote data set via telephone lines.

It is a further object of the present invention to provide such a dial-in data transmission which allows a central computer access to a remote data device at preselected times on, for example, a monthly basis, and also at more frequent intervals.

It is furthermore an object of the present invention to provide a dial-in data transmission system having the capability to allow a central computer to access the remote data device during specified intervals in time on a frequent basis, such that, during these additional time intervals, the subscriber's use of the telephone is substantially unimpaired.

It is yet still a further object of the present invention to provide such a dial-in data transmission system utilizing the time independent data transmission system described in U.S. Pat. Nos. 4,578,534 and 4,654,868.

It is furthermore an object of the present invention to provide a dial-in data transmission system which is particularly suitable for providing access by a central computer to remote data devices such as utility meters.

The above-described deficiencies of the dial-in system wherein a remote data device is programmed to dial up the central computer at a preselected time can be cured if the remote data device can also standby at a common time each day to receive instructions, if necessary, from the central computer. Such a standby capability can be provided by suitably coupling the time independent data transmission system (TIDTS) described in U.S. Pat. No. 4,578,534 with a conventional dial-in data transmission system wherein the data device is programmed to dial up the central computer at a preselected time. Accordingly, the conventional dial-in system is modified by programming the clock circuit of the dial-in system to insert the TIDTS circuit between the data device and the telephone line for a period of time each day (a period common to the data devices at all locations) and preferably in the middle of the night, so as to interfere with normal telephone usage as little as possible.

Thus, the central computer can call any particular data device, or several data devices in succession, on any particular day, and hang up after one ring, in accordance with the time independent data transmission system described in U.S. Pat. No. 4,578,534. The data device called will then call the computer back and will transmit the particular data, for example, a meter reading, in accordance with the teachings of U.S. Pat. No. 4,578,534. As noted in U.S. Pat. No. 4,578,534, a call from a person during the standby period will be coupled to the telephone instrument after the first ring, the first ring having been suppressed by the time independent data transmission device (TIDTD). The telephone instrument may be used at any time by lifting the handset, even if the computer and data device are in communication, as will be described below. Additionally, by utilizing the time independent data transmission system described in U.S. Pat. No. 4,654,868, the present invention can be applied to the accessing of a plurality of data devices at a remote location.

The above and other objects of the present invention are achieved by an apparatus coupling a telephone data set at a first location to a telephone transmission line connected to a telephone instrument and for enabling communication of data between the data set and a second location over the telephone transmission line comprising first switching means coupling the telephone instrument and the data set to the telephone transmission line in a first state of the first switching means, clock means coupled to the data set through the switching means in the first state of the switching means and for providing a trigger signal to the data set to cause the data set to communicate data over the telephone transmission line to the second location periodically at a predetermined time, and further for placing the switching means into a second state periodically during a predetermined time interval, data transmission means coupled to the telephone transmission line and further coupled to the telephone instrument and the data set through the first switching means, and having a data set line connected to the data set through the switching means when the switching means is in the second state, the data transmission means normally connecting the data set line to the telephone transmission line, the data transmission means further having a telephone instrument line connected to the telephone instrument through the switching means when the switching means is in the second state, the data transmission means disconnecting the data set line from the telephone transmission line and connecting the telephone instrument line to the telephone transmission line in response to any of selected ones of a plurality of first electrical signals transmitted on the telephone transmission line, the first signals each being indicative of a call from a caller on the telephone transmission line, the data transmission means preventing disconnection of the data set in response to a selected one of the first signals, the data transmission means further comprising means for detecting any of the first electrical signals transmitted on the telephone transmission line without answering the call and for generating a second electrical signal when any of the first electrical signals on the telephone transmission line has terminated, indicating that the caller has hung up, the data set being adapted to communicate data to the second location via the first switching means over the data set line when the switching means is in the second state during the predetermined time interval and further via the data transmission means and the telephone transmission line in response to the generation of the second electrical signal after the selected one of the first electrical signals has terminated.

Other objects features and advantages of the invention will be apparent from the detailed description below.

BRIEF DESCRIPTION OF THE DRAWINGS

The invention will be described in greater detail in the following detailed description with reference to the drawings in which:

FIG. 1 shows the dial-in data transmission system having standby capability according to the present invention useful in allowing a central computer access to a remote data set;

FIG. 1a shows in more detail the time independent data transmission device of U.S. Pat. No. 4,578,534 suitably modified as utilized in the device shown in FIG. 1;

FIG. 1b shows the operation graphically of a part of the time independent data transmission device shown in FIG. 1a;

FIG. 2b shows the time independent data transmission device of FIG. 1a modified in accordance with FIG. 2 which allows the central computer to access a plurality of data devices at a remote location.

DETAILED DESCRIPTION

Figure 2:
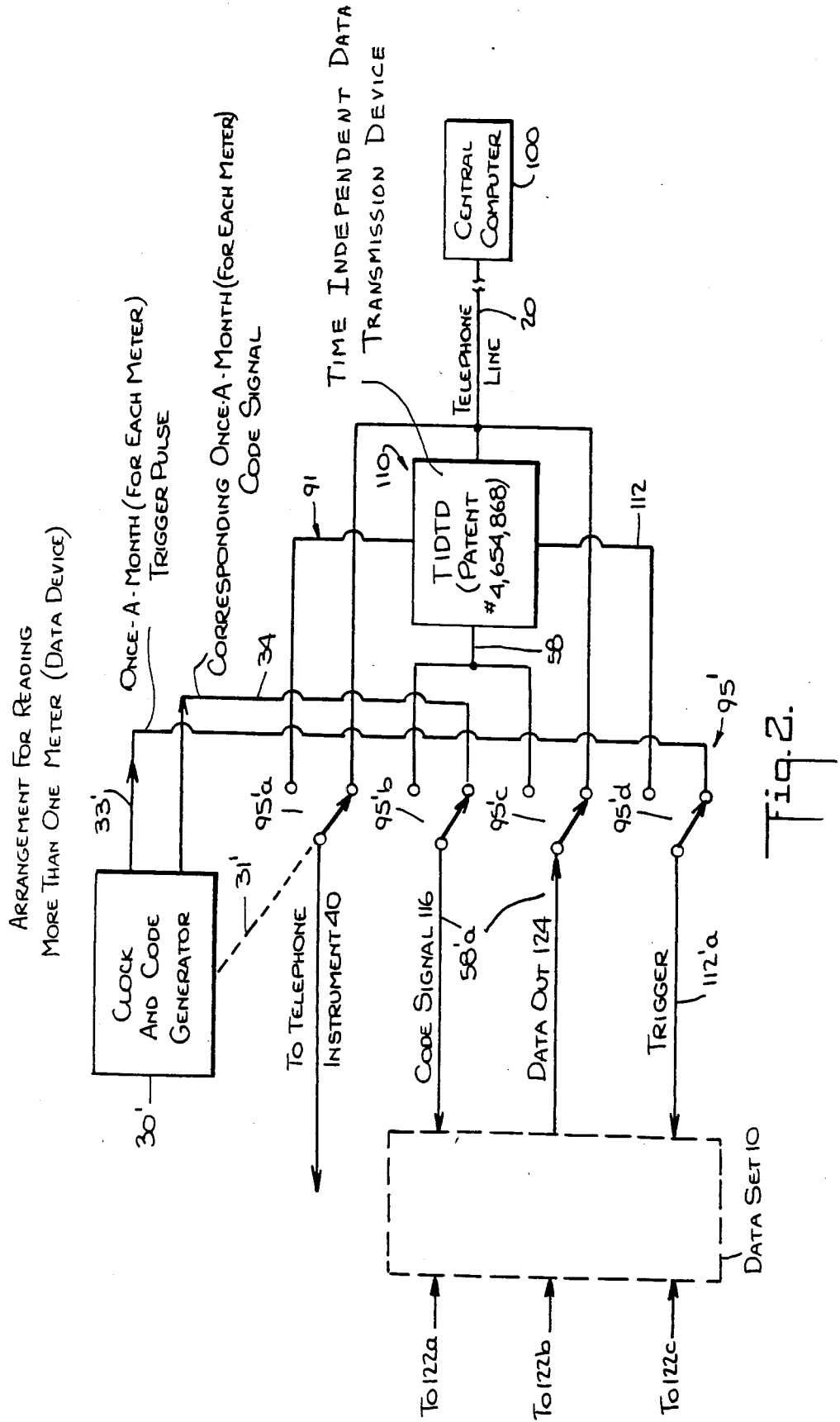
FIG. 2 shows the dial-in data transmission system having standby capability shown in FIG. 1 modified for use so as to allow a central computer to access more than one data device at a remote location.

With reference now to the drawings, FIG. 1 shows basically the arrangement of the time-synchronized dial-in data transmission system having standby capability according to the present invention. The data transmission system includes a time independent data transmission device (TIDTD) 110, which will be described in greater detail below and is described in U.S. Pat. No. 4,578,534.

Telephone line 20, which comprises a pair of conductors, is coupled to the TIDTD 110. A telephone instrument 40 is coupled alternatively to the telephone line 20 and to telephone instrument line 91 coupled to the TIDTD 110, via a first portion 95a of a three-pole switch 95 operated by a clock 30. A data set 10 is coupled to a data device 122, for example, an electric utility meter. The output 58a of the data set 10 is coupled alternatively to the TIDTD 110 via a data set line 58 and to the telephone line 20 via a second portion 95b of the three-pole switch 95. The data set also has a trigger input 112a which is coupled alternatively to the TIDTD 110 via a trigger line 112 and to the telephone line 20 via a third portion 95c of the three-pole switch 95. The TIDTD 110 trigger line 112 provides a signal to switch 95c for use in activating the data set 10 to dial up the central computer when the central computer calls during the data set's standby time period, as will be explained in greater detail below. The TIDTD 110 data set line 58 comprises a line on which the output of the data set 10 is provided when the data set dials up the central computer during the standby time period. Telephone instrument line 91 couples the telephone instrument to the telephone line 20 via the TIDTD 110 during the standby period. At other than the standby period the telephone instrument 40 and data set 10 are directly coupled to the telephone line 20 by the switch 95.

In FIG. 1, all lines shown are schematic and are intended to depict signal flow lines. Thus, the lines shown may actually comprise a conductor pair, even though only one line is schematically shown in FIG. 1. Furthermore, each switch portion 95a, 95b and 95c would actually comprise a two pole switch, one pole for each conductor of the pair. The same is true with respect to FIG. 2, to be discussed below.

Clock 30 generates a trigger pulse on line 33 at a predetermined time on a periodic basis, for example, on a once a month interval, which is supplied to data set 10 trigger line 112a via switch portion 95c when the switch 95 is in its normal position, as shown in FIG. 1. In the normal position of switch 95, the telephone line 20 is coupled directly to the telephone instrument 40 and to the output 58a of the data set 10. Accordingly, at the predetermined time, for example, once a month, the clock 30 provides a trigger pulse to data set 10, thus causing data set 10 to dial up the central computer and provide data to the central computer via the output 58a.

The initial output of data set 10 is a dial up routine provided over the telephone lines to the central computer, which then allows the central computer to communicate with the data set and retrieve the data stored in the attached device 122, for example, a water, gas, electric or other utility meter. During the computer-data set communication at the predetermined time, the user cannot utilize telephone instrument 40 because of the ongoing communication between the central computer and the data set 10. However, this is not a significant problem, since it occurs only once a month and only for a brief period of several seconds.

In order to allow the central computer to communicate with the data set 10 at other than during the time period at the predetermined time once a month, clock 30 also executes a standby switching cycle on a more frequent basis, for example, once a day, as shown by the dotted lines 31. Thus, for example, once a day, preferably in the middle of the night, clock 30 switches switch 95 into its second position, such that the telephone instrument 40 is connected via line 91 to TIDTD 110, the output 58a of the data set 10 is connected via line 58 to the TIDTD 110 and the trigger input 112a of the data set 10 is connected to trigger line 112 of the TIDTD 110. Accordingly, the data set and telephone instrument are removed from direct communication with the telephone line 20 and can only communicate with the telephone line through the TIDTD 110 during the standby period.

The purpose of the TIDTD 110 is fourfold. First, it allows the central computer to call the data set during the standby period with a preselected number of rings and allows the data set to dial up the computer. Second, it allows the user complete access and use of his telephone during the standby period, regardless of whether the computer is communicating with the data set. Third, it allows outside calls, i.e., noncomputer calls, to be directed to the telephone instrument 40 so that they can be answered by the telephone user during the standby period (of course when the central computer is not already communicating with the data set). Fourth, the TIDTD prevents a call from a human caller from being answered during the standby period if the telephone user is not at home.

The TIDTD 110 as modified is shown in detail in FIG. 1a and its operation is also described in U.S. Pat. No. 4,578,534. Its operation will be explained herein for convenience.

The TIDTD 110 includes a ring detector and trigger circuit 50, a ring signal counting circuit 80, and a subscriber priority circuit 34. Data set 10, as shown in FIG. 1, is coupled via lines 58 and 112 to the TIDTD 110, and in particular, to the subscriber priority circuit 34 and to the ring detector and trigger circuit 50, respectively. Telephone instrument 40 is coupled to the subscriber priority circuit 34 via telephone instrument line 91. The telephone lines 20 are coupled to the ring signal counting circuit 80 and the ring detector and trigger circuit 50. Data set 10 is normally connected to the telephone line 20 through a first dual set of contacts 60 (a and b) of a relay 61.

The central computer is preferably programmed to provide only one ringing signal or ring burst over the telephone transmission line. In the preferred embodiment, if only one ringing signal is detected, the telephone instrument 40 will remain disconnected, the data set will remain connected and the subscriber's data set will be triggered to dial up the central computer and communicate with the computer. Two way communication is contemplated, i.e., the data set may, for example, both receive data from the computer and transmit data to the computer. Additionally, because of the subscriber priority circuit 34, the subscriber may regain use of the telephone instrument during data transmission simply by lifting the telephone receiver, as will be explained below.

Furthermore, if desired, the subscriber priority circuit can also be employed to allow the subscriber to regain use of the telephone instrument during the brief once a month period of communication between the computer and data set by suitable connection and switching of the subscriber priority circuit as will be evident to a person of skill in the art.

If ring signal counting circuit 80 detects the commencement of a second ring burst in the incoming call, it triggers the latch coil 62 of the relay 61 and thus connects the subscriber's telephone instrument 40 to the telephone line by allowing contacts b and c of contact 60 to make. The data set is thus disconnected and the subscriber's telephone connected which then proceeds to ring and can be used normally. Thus, the TIDTD 110 will suppress the first ring of any call received by the TIDTD 110. If a second ring burst does not follow the first ring burst, the data set remains connected to the telephone line and is caused to dial up the central computer, as will be described in more detail below. Thus, the TIDTD 110 assumes that if only one ring occurs, the central computer called. In the event that the central computer did not call but only one ring is sensed, the data set will still dial up the central computer, but the central computer will be programmed properly to know that it had not called and thus would ignore or reject the call.

Ring signal counter circuit 80 resets itself after each call. After any use of the telephone instrument has been completed, the data set is once more connected to the telephone line by the relay 61 which ha been unlatched by the operation of the subscriber priority circuit 34, to be described in more detail below.

Thus, for selected ones of the ringing signals having more than one ring burst, the data set is disconnected and the telephone instrument connected. For a selected one of the ringing signals, i.e., preferably a ringing signal having only one ring burst, the data set remains connected and the telephone instrument disconnected.

The ring signal counter circuit 80 essentially may be an RC circuit disposed across the telephone lines as shown in FIG. 1 comprising a resistor R, a capacitor C, diode D, resistor BR and gas discharge tube GT. The time constant is chosen to charge the capacitor C through resistor R and diode rectifier D to approximately one-half of the ring signal voltage on the first ring and to a higher voltage on the second ring as shown in FIG. 1b. The higher voltage is sufficient to trigger a gas discharge tube GT in series with the latch coil 62 of relay 61, thus energizing the latch coil and connecting the telephone instrument to the telephone line while disconnecting the data set from the telephone line. A diode 84 is placed between the pulse amplifier and shaper 35, to be described below, and the latch coil 62, to prevent pulses from the circuit 80 from feeding back into circuit 35. A high resistance bleeder resistor BR discharges the capacitor slowly after each single-ring call from the central computer and between successive rings from a non-computer caller, as shown in FIG. 1b. Other types of counting circuits could obviously be used for this purpose. For example, the gas discharge tube could be replaced by a semi-conductor device, e.g., a threshold sensitive zener diode in series with a resistor coupled across the resistor BR, the junction of the zener diode and the resistor being coupled to the base of a switching transistor having its emitter-collector path in series with latch coil 62. Furthermore, other circuits could be used, such as filter circuits and appropriate digital logic counters.

The operation of ring detector and trigger circuit 50 will now be explained. When the central computer calls, or if anyone else calls, the ring signal on the telephone line will charge capacitor 36 through rectifying diode 38 and isolating resistor 42. Contacts 44 operated by relay coil 46 of relay 45 will, therefore, close once relay coil 46 is energized. Resistor 48 and capacitor 36 have a time constant chosen so that capacitor 36 remains sufficiently charged between successive rings of the same call and coil 46 remains energized. When the caller hangs up and the ringing stops, capacitor 36 will slowly discharge through resistor 48 and coil 46 until relay 45 become deenergized, opening contacts 44. A voltage source 54 and inductor 52 in series therewith are disposed across contacts 44. When contacts 44 open, a voltage pulse is induced across inductor 52. This pulse is coupled through diode 56 to the data set 10 to trigger the data set's dial up function. Diode 56 insures that only pulses of the proper polarity are coupled to the data set. Thus, the opposite pulse induced across inductor 52 when contacts 44 close will not be coupled to the data set. The data set 10 can then dial up the central computer through switch portion 95b and data set line 58, which line is used both for dial up routines and for data transmission, and further through dual pairs of contacts a and b of contacts 60 of relay 61 controlled by relay coils 62 and 64. The operation of relay coils 62 and 64 will be described in more detail later with reference to the subscriber priority circuit 34. If the central computer called (only one ring signal detected by counter circuit 80), at the time that the data set 10 initiates the dial up routine and when the telephone handset is down, the pairs of contacts a and b of contact 60 will remain made, so that the data set output lines are connected to the telephone line 20 and the central computer can be dialed up and communication between data set and computer can occur.

The embodiment of ring detector and trigger circuit 50 shown in FIG. 1a is only one form of the circuit. Relay 45 could be replaced by a switching transistor, for example, and the inductor 52 and related circuitry could be replaced by a single shot or monostable multivibrator triggered to output a pulse when the switching transistor is biased off when the ringing signal terminates.

Should a noncomputer call (i.e., more than one ring signal) be received, data set 10 will attempt to dial up the computer even though the computer did not call. Because, however, contact pairs a and b of relay contacts 60 have opened and remain open for a sufficient time, no such dial up signal will be transmitted to the computer. Should a single ring signal be received which was not generated by the central computer, the central computer can be programmed so that it would ignore or reject the return call because it did not call the data set.

The data set 10 can be any of many commercially available devices. For example, if the system of the invention is used to obtain data regarding the electric power used by a consumer, it might comprise a Power Demand Accumulator model 2000 series manufactured by Fairchild Space and Electronics Company. The present invention would allow such a device to be coupled to the consumer's normal telephone line and allow power meter readings to be read over the telephone line.

The subscriber priority circuit 34 mentioned earlier is designed to reconnect the telephone instrument 40 to the telephone line 20 when it is normally disconnected if the subscriber lifts the telephone handset to use the telephone. Normally, the telephone instrument is disconnected from the telephone line 20 by contacts 60, which also form a part of circuit 34. The telephone, however, is also connected to the pulse amplifier and shaper 35 of subscriber priority circuit 34 via voltage source 70 and resistor 72. The impedance looking into resistor 72 and source 70 from the telephone is chosen so that it does not interfere with normal telephone use. When the telephone handset is lifted, a voltage pulse of a particular polarity appears across resistor 72. This pulse energizes latch coil 62 of relay 61 through a pulse amplifier and shaper 35 and connects the telephone instrument through contacts b and c of contacts 60 of relay 61 to the telephone line 20, while disconnecting the data set from the telephone line by opening normally closed contacts a and b of contacts 60 of relay 61. When the subscriber replaces the telephone handset ("hangs up"), a pulse of opposite polarity to the previous pulse energizes unlatch coil 64 of relay 61 and opens contacts b and c and closes contacts a and b, thus reconnecting the data set to the telephone line and disconnecting the telephone instrument from the telephone line. The pulse amplifier and shaper circuit therefore performs the dual function of shaping the pulse at its input and discriminating between positive and negative pulses so as to energize the proper relay coil 62 or 64. Pulse amplifier and shaper 35 may take the form of various circuits known in the art.

Figure 2A:
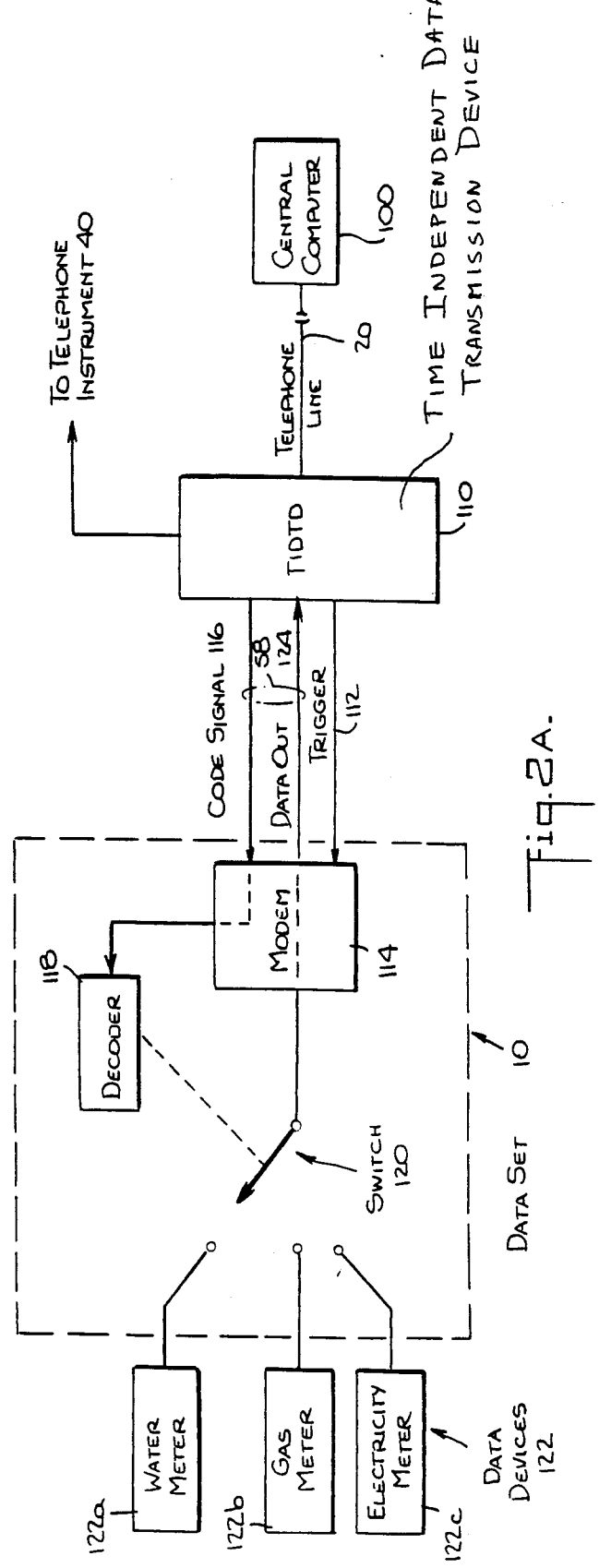
FIG. 2a shows the arrangement of the time independent data transmission device according to U.S. Pat. No. 4,654,868 for allowing a central computer to access more than one data device at a remote location.

FIG. 2 shows a modification of the apparatus shown in FIG. 1 wherein it is desired that a plurality of data devices 122 at a remote location be accessed by a central computer. For example, as shown in FIG. 2a, which shows the time independent data transmission system according to U.S. Pat. No. 4,654,868, wherein the time independent data transmission system of U.S. Pat. No. 4,578,534 has been modified to allow access to a plurality of data devices, it may be desirable to access a water meter 122a, a gas meter 122b and an electricity usage meter 122c at a remote location via a data set 10. As shown in FIG. 2a, the central computer 100 transmits a ringing signal having one ring burst over telephone line 20 to TIDTD 110, as previously explained. If only a single ring burst is detected, the TIDTD 110 transmits a trigger signal on line 112 to the data set 10, which includes a modulator/demodulator device (modem) 114, as is well known to those skilled in the art of telecommunications. In response to the trigger signal on line 112, modem 114 calls the central computer 100 via an automatic dial-up routine through the TIDTD 110, as previously explained. In response to the dial up routine, central computer 100 sends a code signal over the telephone lines 20 to the TIDTD 110, which transmits the code signal 116 via lines 58 to the modem 114. The code signal 116 is received by modem 114 and forwarded to decoder 118 which can comprise any one of a number of decoding devices, as will be apparent to one of skill in the art. Decoder 118 controls a switch 120, which selects the proper data device 122, which, for example, may comprise a water meter 122a, a gas meter 122b and an electricity usage meter 122c. The reading stored or present in the data device 122 is then transmitted by modem 114 over lines 58 as signal 124 to TIDTD 110 and then to the central computer 100 over telephone lines 20. In an embodiment of the device, signals 116 and 124 are transmitted over the same transmission line or lines 58, meaning a two-way transmission occurs over these lines.

As shown by the apparatus illustrated in FIG. 2a, central computer 100 may access a plurality of data devices at the subscriber remote location by sending only a ringing signal having a single ring burst, which triggers modem 114 via TIDTD 110, and a code signal, which is transmitted to decoder 118 for selecting the selected one of the data devices 122. Data devices 122 can either automatically transmit their data via modem 114 to the central computer, or the central computer can transmit a further signal to trigger the particular data device to transmit its reading via the modem 114 and TIDTD 110 to the central computer. Thus, a central computer can selectively read any of a multiplicity of data devices at a given location by using the apparatus shown.

The TIDTD 110 shown in FIG. 2a is the same as that shown in FIG. 1a The coupling of the TIDTD 110 to the data set 10 and the coupling of the data set 10 to data devices 122 is shown for reference in FIG. 2b. The actual switching devices 95 provided for coupling the TIDTD to the telephone and data set have not been shown in FIG. 2a for simplicity.

With reference now to FIGS. 2 and 2b, the coupling of TIDTD 110 to data set 10 and telephone 40 and the coupling of a clock and code generator circuit 30 to the data set 10 and TIDTD 110 are shown schematically in more detail.

The TIDTD 110 is coupled to data set 10 via a switch 95' having a plurality of portions 95'a, 95'b, 95'c and 95'd. Switch 95' is controlled by clock and code generator 30' as shown by dashed line 31'. As in the embodiment shown in FIG. 1, clock and code generator 30' performs a once a month generation of a trigger pulse to the data set 10 via a line 33'. As with FIG. 1, FIG. 2 is intended to be schematic, and single lines are shown where two conductors are required and each switch portion actually is a two pole switch. Line 33' is coupled to section 95'd of switch 95' which is coupled to data set 10 via line live 112'a. Thus, on a once a month basis, data set 10 is activated to dial up the central computer 100 directly without going through TIDTD 110, thus allowing the central computer to access any one of or all the data devices 122 coupled to the data set 10 via data output line 58'a and switch portion 95'c. All the portions of switch 95' are shown in their normal position, i.e., with the telephone lines directly connected to the telephone instrument and the data set 10. Clock and code generator 30' further generates a code signal via line 34 for each data device 122 desired to be read, which is supplied to data set 10 and thus allows selection of the particular data device 122 via decoder 118. The code signal is supplied to the data set 10 via portion 95'b of switch 95'.

The clock and code generator 30' executes a once a day switching cycle to switch each of the portions of switch 95' to the other position such that central computer 100 can access data set 10 via the TIDTD 110. Thus, at a particular time each day, the data set 10 placed is in a standby mode such that it can be accessed by the central computer. Preferably, this time period is in the middle of the night when it will cause the least disturbance. TIDTD 110 functions exactly the same as explained with reference to FIGS. 1, 1a and 1b, and performs the additional functions of providing the code signal to data set 10 as explained with reference to FIG. 2a. Thus, the telephone instrument 40 during the once a day time interval is disconnected from direct connection with the telephone line and is connected to the TIDTD 110 via switch portion 95'a. Ring signals are detected by the ring detector and trigger circuit 50 of TIDTD 110 and the number of ring signals is counted by the ring signal counter circuit 80. Lines 58 of TIDTD 110 are coupled to switch portions 95'b and 95'c such that the code signal from the central computer identifying the particular data device 122 to be accessed is provided to the 12 data set 10 via lines 58'a, as shown. The output data from the data set corresponding to the data accessed at the particular data device 122 is coupled to the TIDTD 110 via switch portion 95'c and is provided to the central computer over the telephone lines by the TIDTD.

The trigger input of data set 10, line 112'a, is also coupled to the TIDTD 110 during the once a day time interval, such that incoming calls trigger the data set 10 to call up the computer. Ring signal counter circuit 80 insures that only calls having one ringing signal result in a successful dial-up attempt with the central computer 100, i.e., allowing the dial up routine to be received by central computer 100. Thus, assuming a single ring signal was detected by the ring signal counter circuit, and the data set has been triggered by the ring detector and trigger circuit, the dial up routine will be 027 provided over lines 58'a to the TIDTD 110, which will then provide the dial up routine via relay contacts 60 to telephone lines 20 to access the central computer 100. Central computer 100 then provides code signals over telephone lines 20 to access any one or all of the data devices 122, as explained with reference to FIG. 2a.

Although the TIDTD 110 shown in the drawing figures indicates discrete components, and schematically indicates some electromechanical relays and switches, it is clear that the system can be constructed utilizing discrete semiconductor devices or embodied in a solid state, integrated circuit produced on a silicon or similar chip. For example, the function of the electromechanical relays which are schematically indicated in FIG. 1a, could be performed by switching transistors. Furthermore, switch 95, 95' may itself comprise a semiconductor switching device. Also , as is well known, modem 114, decoder device 118 and switch 120, which comprise data set 10, all may comprise solid state devices.

Furthermore, other embodiments within the scope of the invention are possible. For example, other arrangements of 17 switch 95, 95' may be used and it may not be necessary to switch both lines of a conductor pair. For example, certain lines in the drawing figures may use common grounds, in which case only one line of the pair need be switched.

In the foregoing specification, the invention has been described with reference to specific exemplary embodiments thereof It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus coupling a telephone data set at a first location to a telephone transmission line connected to a telephone instrument and for enabling communication of data between the data set and a second location over the telephone transmission line comprising:

first switching means coupling said telephone instrument and said data set to said telephone transmission line in a first state of the first switching means;

clock means coupled to said data set through said first switching means in the first state of said switching means and for providing a trigger signal to said data set to cause said data set to communicate data over said telephone transmission line to the second location periodically at a predetermined time, and further for placing said switching means into a second state periodically during a predetermined time interval;

data transmission means coupled to said telephone transmission line and further coupled to said telephone instrument and said data set through said first switching means, and having a data set line connected to said data set through said switching means when said switching means is in said second state, said data transmission means normally connecting said data set line to said telephone transmission line, said data transmission means further having a telephone instrument line connected to said telephone instrument through said switching means when said switching means is in said second state, said data transmission means disconnecting said data set line from said telephone transmission line and connecting said telephone instrument line to said telephone transmission line in response to any of selected ones of a plurality of first electrical signals transmitted on said telephone transmission line, said first signals each being indicative of a call from a caller on said telephone transmission line, the data transmission means preventing disconnection of said data set in response to a selected one of the first signals, said data transmission means further comprising means for detecting any of said first electrical signals transmitted on said telephone transmission line without answering the call and for generating a second electrical signal when any of the first electrical signals on said telephone transmission line has terminated, indicating that the caller has hung up, said data set being adapted to communicate data to the second location via said first switching means over said data set line when said switching means is in said second state during said predetermined time interval and further via said data transmission means; and the telephone transmission line in response to the generation of said second electrical signal after said selected one of said first electrical signals has terminated.

2. The apparatus recited in claim 1, wherein said data set includes a data device comprising a gas, water or electricity usage meter.

3. The apparatus recited in claim 1, wherein said predetermined time interval occurs more frequently than said predetermined time.

4. The apparatus recited in claim 3, wherein said predetermined time occurs approximately once a month and said predetermined time interval occurs approximately once a day.

5. The apparatus recited in claim 4, wherein said predetermined time interval occurs during night time hours.

6. The apparatus recited in claim 1 wherein said data transmission means comprises second switching means coupled to said data set line, said telephone instrument line and said telephone transmission line and normally connecting said data set line to said telephone transmission line.

7. The apparatus recited in claim 1 wherein said first switching means comprises a three pole, two position switch means, one pole coupled to said telephone instrument, a second pole coupled to said data set for communication of data and a third pole coupled to a trigger input of said data set for providing a trigger signal to said data set for causing said data set to communicate data on said telephone transmission line.

8. The apparatus recited in claim 7 wherein said trigger input is coupled in the first state of said first switching means to said clock means for providing a first signal to the data set at said predetermined time and in the second state to said data transmission means whereby said data transmission means provides a trigger signal to said data set to activate said data set during said predetermined time interval.

9. The apparatus recited in claim 6, further comprising subscriber priority means coupled to said data set line, said telephone instrument line and said telephone transmission line, for connecting said telephone instrument line to said telephone transmission line and disconnecting said data set line from said telephone transmission line in response to a first electrical signal generated by said telephone instrument, and for disconnecting said telephone instrument line from said telephone transmission line and reconnecting said data set line to said telephone transmission line in response to a second electrical signal generated by said telephone instrument.

10. The apparatus recited in claim 1 wherein each of said plurality of first electrical signals transmitted on said telephone transmission line comprises a ringing signal having a varying number of ring bursts, and wherein said data transmission means generates said second electrical signal when the transmission of said ringing signal on said telephone transmission line terminates.

11. The apparatus recited in claim 10 wherein said selected one of said first electrical signals is a ringing signal having a single ring burst, said data transmission means preventing disconnection of said data set line when said ringing signal having a single ring burst is detected.

12. The apparatus recited in claim 6 wherein said first electrical signals each comprise ringing signals having a varying number of ring bursts and said data transmission means further comprises counting means for sensing the number of ring bursts in said first electrical signals and for preventing disconnection of said data set line from said telephone transmission line if the number of ring bursts is one and for disconnecting said data set line from the telephone transmission line if the number of ring bursts is greater than one.

13. The apparatus recited in claim 9 wherein said subscriber priority means includes said second switching means normally connecting said telephone transmission line to said data set line, and circuit means, coupled to said second switching means and said telephone instrument line, for generating first and second signals and being responsive to said first and second electrical signals generated by said telephone instrument, said second switching means being responsive to said first and second signals generated by said circuit means and disconnecting said data set line from said telephone transmission line and connecting said telephone instrument line to said telephone transmission line in response to said first signal generated by said circuit means and connecting said data set line to said telephone transmission line and disconnecting said telephone instrument line from said telephone transmission line in response to said second signal generated by said circuit means.

14. The apparatus recited in claim 13 wherein said first electrical signal generated by said telephone instrument is generated when the telephone receiver is lifted, and said second electrical signal generated by said telephone instrument is generated when the telephone receiver is replaced.

15. The apparatus recited in claim 14 wherein said first and second electrical signals generated by said telephone instrument comprise pulse signals of opposite polarity and said circuit means includes pulse discrimination means for discriminating between said pulse signals generated by said telephone instrument.

16. The apparatus recited in claim 1 wherein said data set is coupled to a plurality of data devices and further comprising first means for selecting a particular one of said data devices for communication via said data set with said telephone transmission line at said predetermined time.

17. The apparatus recited in claim 16 wherein said first means for selecting comprises code generator means for generating code signals associated with respective one of said data devices.

18. The apparatus recited in claim 17, further comprising decoding means for decoding said code signals and means responsive to said decoding means for selecting a particular one of said data devices.

19. The apparatus recited in claim 18 wherein said decoding means is responsive to said first means for selecting at said predetermined time when said first switching means provides a code signal from said code generator means, and further is responsive to said data transmission means during said predetermined time interval when said first switching means provides a code signal from said data transmission means for selecting one of said data devices, said code signal being transmitted over said telephone transmission line from said second location.

20. The apparatus recited in claim 19 wherein said code signal from said second location is coupled to said decoding means by said data set line.

21. The apparatus recited in claim 18 wherein said data set comprises:

communication means for receiving said second electrical signal from said data transmission means and for communicating with said second location in response to the generation of said second electrical signal and further comprising means for receiving said code signal from said second location;

said decoding means being coupled to said means for receiving said code signal; and said means responsive to said decoding means comprising switch means coupled to said decoding means for switching between selected ones of said data devices in response to said code signal and for coupling the selected one of the data devices to said communication means.

22. The apparatus recited in claim 19 wherein said communication means comprises a modem.

23. The apparatus recited in claim 21 wherein said data devices comprise consumption meter means having electrical outputs, each of said consumption meter means being responsive to a selected one of physical measured quantities.

24. The apparatus recited in claim 23 wherein said data devices comprise selected ones of gas, electricity and water usage meters.

25. The apparatus recited in claim 16 wherein a central computer is located at said second location.

26. The apparatus recited in claim 16 wherein said first switching means comprises a four pole, two position switch means, one pole coupled to said telephone instrument, a second pole coupled to said data set for communication of data, a third pole coupled to a trigger input of said data set for providing a trigger signal to said data set for causing said data set to communicate data on said telephone transmission line and a fourth pole coupled to a code signal input of said data set for providing a code signal for selecting a particular one of said data devices for communication via said data set.

* * * * *

UNITED STATES PATENT AND TRADEMARK OFFICE
CERTIFICATE OF CORRECTION

PATENT NO. : 4,847,892
DATED : Jul. 11, 1989
INVENTOR(S) : Edwin F. Shelley

It is certified that error appears in the above-identified patent and that said Letters Patent is hereby corrected as shown below:

Col. 2, line 31, delete "27".

Col. 8, line 24, delete "ha" and insert --has--.

Col. 11, line 34, delete "live".

Col. 12, line 3, delete "12".

Col. 12, line 19, delete "027".

Col. 12, line 42, delete "17".

Col. 13, line 40, after "means", delete ";".

Signed and Sealed this

Twenty-sixth Day of June, 1990

Attest:

HARRY F. MANBECK, JR.

Attesting Officer

Commissioner of Patents and Trademarks